United States Patent [19]
Balse et al.

[11] Patent Number: 5,932,509
[45] Date of Patent: Aug. 3, 1999

[54] PREPARATION OF ION-EXCHANGED ZEOLITES

[75] Inventors: Vijay Ramanand Balse, Chatham; Martin Bülow, Basking Ridge; Philip Connolly, Little Falls; Frank Fitch, Bedminster; Adeola Florence Ojo, Chatham, all of N.J.

[73] Assignee: The BOC Group, Inc., Murray Hill, N.J.

[21] Appl. No.: 08/665,714

[22] Filed: Jun. 18, 1996

[51] Int. Cl.⁶ .................................................. B01J 29/06
[52] U.S. Cl. .......................... 502/65; 502/64; 502/66; 502/73; 502/74; 502/79
[58] Field of Search ..................... 502/64, 65, 66, 502/73, 74, 79

[56] References Cited

U.S. PATENT DOCUMENTS 5,152,813  10/1992  Coe et al. .
5,174,979  12/1992  Chao et al. .
5,258,058  11/1993  Coe et al. .
5,464,467  11/1995  Fitch et al. .
5,616,170   4/1997  Ojo et al. ................................. 95/101

*Primary Examiner*—Thomas Dunn
*Attorney, Agent, or Firm*—Coleman R. Reap; Salvatore P. Pace

[57] ABSTRACT

Zeolites in particulate form that are uniformly exchanged with both lithium ions and trivalent cations are produced by first partially ion-exchanging the zeolite in powdered form with one or more selected trivalent ions, then agglomerating and calcining the partially trivalent cation-exchanged zeolite, then ion-exchanging the calcined agglomerate with lithium ions, and finally activating the trivalent cation- and lithium ion-exchanged zeolite.

16 Claims, No Drawings

PREPARATION OF ION-EXCHANGED ZEOLITES

FIELD OF THE INVENTION

This invention relates to the preparation of ion-exchanged zeolites, and more particularly to the preparation of zeolites that are ion-exchanged with both trivalent cations and lithium ions.

BACKGROUND OF THE INVENTION

Zeolites, particularly type X zeolite, having lithium as the major exchangeable cation have been shown to adsorb nitrogen from gas streams much more strongly than do zeolites which have other cations, e.g. sodium ions, as the major exchangeable cation. See, for example, U.S. Pat. Nos. 3,140,933 and 4,859,217, which disclose the use of type X zeolite having 86% and greater than 88%, respectively, of its base ions replaced by lithium ions for the separation of nitrogen from oxygen. Lithium-exchanged natural mordenite is reported to be a good adsorbent for oxygen pressure swing adsorption (PSA) in papers by H. Minato and M. Watanabe, published in Scientific Paper, University of Tokyo, (1978), 28, 218, and S. Furuyama and K. Sato in the Journal of Physical Chemistry (1982), 86, 2498–2503.

Zeolites with high percentages of lithium ions as charge compensating ions have very high affinities for water, and adsorbed water, even in small amounts, seriously diminishes the adsorptive capacity of the zeolites. Accordingly, to secure optimum adsorption performance, it is necessary to activate these zeolites by heating them to temperatures as high as 600 to 700° C. to drive off as much adsorbed water as possible. Care must be exercised during activation, however, to avoid heating these zeolites to temperatures much above 700° C., since highly lithium ion-exchanged zeolites have reduced thermal stability at such high temperatures.

U.S. Pat. No. 5,174,979 asserts that lithium/alkaline earth metal X zeolites having lithium/alkaline earth metal molar ratios in the range of about 95:5 to 50:50 have thermal stabilities greater than the corresponding pure lithium zeolites and good adsorption capacities and selectivities, and U.S. Pat. No. 5,152,813 discloses the adsorption of nitrogen from gas mixtures using crystalline X-zeolites having as exchangeable ions combinations of lithium and a second ion selected from calcium, strontium and mixtures of these.

U.S. Pat. No. 5,464,467 discloses the preparation of nitrogen-selective lithium-and trivalent ion-exchanged type X zeolites that have improved thermal stability relative to comparable lithium-exchanged type X zeolites. The exchanged zeolites were prepared by pelletizing (without a binder) type X zeolite or type LSX (low silicon type X zeolite), then exchanging the pelletized zeolites with aqueous lithium chloride solution and finally exchanging the lithium-exchanged zeolites with selected lanthanide chlorides, or by first exchanging sodium LSX with an aqueous rare earth chloride solution and then lithium exchanging the rare earth-exchanged zeolite to the final product without an intermediate calcination step. The disclosure of this patent is incorporated herein by reference.

U.S. patent application Ser. No. 08/515,184, filed Aug. 11, 1995, now U.S. Pat. No. 5,616,170 discloses the preparation and use of thermally stable nitrogen-selective lithium and trivalent ion-exchanged zeolites selected from chabazite, offretite, erionite, levyne mordenite, gmelinite, zeolite A, zeolite T, EMC-2, ZSM-3, ZSM-18, ZK-5, zeolite L, beta zeolite, and mixtures of these. The trivalent ions which are exchanged with the zeolite are selected from aluminum, scandium, gallium, indium, yttrium, iron (III), chromium (III), single lanthanides, mixtures of two or more lanthanides and mixtures of these. It is stated in the disclosure of this patent application that the order of cation exchange is not critical, but it is preferred to first cation exchange the base zeolite with one or more of the specified trivalent ions and then exchange the zeolite with lithium ions. It is further stated in this patent that aggregation can be effected before, after or between the trivalent metal and lithium ion-exchanges but it is preferred to use as the starting material an X zeolite which is already in aggregate form because the sodium form of the zeolite is more thermally stable than the lithium/trivalent metal zeolites and less susceptible to damage from the high temperatures used in the aggregation process. The disclosure of this patent application is incorporated herein by reference.

It has been discovered that when an aggregated form of the zeolite is ion-exchanged with a trivalent cation, the trivalent cation is concentrated at or near the surface of the aggregated particles. It appears that the trivalent cations are not able to penetrate deeply into the particles to produce particles having a uniform distribution of trivalent cations throughout their interior portions. It is highly desirable to produce exchanged zeolite particles which have a uniform distribution of trivalent cations because portions of the zeolite which are rich in lithium ions but depleted in trivalent cations tend to undergo degradation at the high temperatures required for activation of the zeolite. Accordingly, methods of preparing trivalent cation- and lithium ion-exchanged zeolites with uniform distribution of both the trivalent cations and the lithium ions are desired for commercial manufacturing purposes. The present invention provides such a method.

SUMMARY OF THE INVENTION

According to a broad embodiment of the invention, zeolites in particulate form that are uniformly exchanged with lithium ions and trivalent cations are produced by partially ion-exchanging the zeolite in powdered form with one or more selected trivalent ions, agglomerating and calcining the partially trivalent cation-exchanged zeolite, ion-exchanging the calcined agglomerate with lithium ions, and activating the trivalent cation- and lithium ion-exchanged zeolite.

According to a preferred embodiment, the invention comprises a method of preparing zeolite adsorbents by steps comprising:

(a) contacting a zeolite in powdered form and having as initial exchangeable cations one or more ions selected from sodium, potassium, ammonium, hydronium, calcium, strontium, magnesium, barium, zinc and copper II ions, with an aqueous solution of one or more trivalent cations selected from aluminum, scandium, gallium, iron (III), chromium (III), indium, yttrium, single lanthanides, mixtures of two or more lanthanides and mixtures of these, thereby substituting some of the initial exchangeable cations on the zeolite with trivalent cations;

(b) separating the trivalent cation-exchanged zeolite from the aqueous solution;

(c) blending the partially trivalent cation-exchanged zeolite with a binder, and shaping the blended trivalent-exchanged zeolite-binder mixture into aggregate particles;

(e) calcining the aggregate particles at a temperature of about 400 to about 800° C.;

(f) contacting the calcined aggregate particles with an aqueous solution of lithium ions, thereby substituting at least some of the remaining initial exchangeable cations with lithium ions and producing zeolitic particles whose exchangeable cations comprise about 4 to about 50% by equivalents trivalent cations, about 50 to about 95% by equivalents lithium ions and 0 to about 15% by equivalents initial exchangeable cations; and (g) activating the trivalent cation-exchanged and lithium ion-exchanged particulate agglomerates by heating them to a temperature of about 200 to about 700° C.

The lithium- and trivalent-exchanged zeolites prepared according to the invention preferably contain about 5 to about 30% by equivalents trivalent cations, about 70 to about 95% by equivalents lithium ions and 0 to about 10% by equivalents initial exchangeable cations.

In the above-described preferred embodiment, step (a) is generally carried out at a temperature in the range of about 20 to about 100° C., and is preferably carried out at a temperature in the range of about 20 to about 50° C., and step (f) is generally carried out at temperatures above about 70° C., and is preferably carried out at temperatures in the range of about 90 to about 100° C.

In a preferred aspect of the above embodiment, step (e), above, is carried out at a temperature in the range of about 500 to about 700° C.

In another preferred embodiment the zeolite is zeolite type X. In a preferred aspect of this embodiment, the trivalent cations are selected from aluminum, cerium, lanthanum, mixtures of two or more lanthanides in which the total lanthanum, cerium, praseodymium, and neodymium ions present in the mixtures comprises at least 50% of the total lanthanide ions, and mixtures of these.

In a most preferred embodiment of the invention, the zeolite is type X having a lattice silicon-to-aluminum atomic ratio between 0.9 and 1.10.

In another aspect of the preferred embodiment, the process includes, prior to step (f), above, replacing at least some of the initial exchangeable cations on the zeolite with sodium ions by contacting the zeolite with an aqueous solution of a sodium salt. This step is preferably carried out prior to step (a) or between steps (e) and (f).

Step (a) of the preferred embodiment preferably comprises forming an aqueous solution of one or more salts of the one or more trivalent cations, and mixing the zeolite with the aqueous solution. The anions of the one or more salts are selected from chloride ions, nitrate ions, sulfate ions and mixtures of these.

In another preferred aspect of the preferred embodiment, step (f), above, is carried out by contacting the calcined aggregate particles with a stream of an aqueous solution of lithium salt. The lithium salt is most preferably lithium chloride, lithium nitrate, lithium sulfate or a mixture of two or all of these.

In another preferred aspect of the preferred embodiment, prior to carrying out step (f) the calcined aggregate particles are rehydrated by contacting these particles with water or a humidified gas.

DETAILED DESCRIPTION OF THE INVENTION

The invention is useful for preparing nitrogen-selective zeolite-based adsorbents. Such adsorbents can be used to separate nitrogen from the other components of air, such as oxygen and/or argon, helium, neon, hydrogen, etc. The modified zeolites are particularly useful for the separation of nitrogen from oxygen or argon.

Zeolites that are particularly useful when modified according to the procedure of the invention are those having a silicon-to-aluminum atomic ratio between 0.95 and 5. Zeolites in this category include type X zeolite, type Y zeolite, faujasite, chabazite, offretite, erionite, levyne, mordenite, gmelinite, type A zeolite, type T zeolite, EMC-2, ZSM-3, ZSM-18, ZK-5, type L zeolite, beta zeolite, and mixtures of these. These zeolites as they occur in nature or as prepared generally have as exchangeable cations, i.e. ions which compensate the negative charge of the aluminosilicate lattice, one or more ions selected from sodium, potassium, ammonium, hydronium, calcium, magnesium, strontium, barium, zinc, copper (II), etc. ions. These ions are not desired in the finished zeolite product; accordingly a large percentage, preferably substantially all, of these ions are replaced by trivalent cations or lithium ions by the process of the invention.

Adsorbent produced by the process of the invention is in the form of discrete particles, so that when it is packed into a column and used in gas adsorption processes, it will not significantly hinder the flow of gas through the column, i.e. gases passing through the adsorbent will experience only small pressure drops across the bed of adsorbent. In order to produce particles of sufficient strength to resist fracturing and erosion during handling and use, it is necessary that the zeolite be aggregated by combining it with a binder. Details concerning the preparation of agglomerated zeolite particles are provided below.

In this specification, parts, percentages and ratios are expressed on a weight basis, unless otherwise indicated. Cation exchange percentages are expressed on an equivalents basis.

Considering the process of the invention in greater detail, the first major step of the process is the ion-exchange of the zeolite with trivalent cations. However, before undertaking this step it is often desirable to replace substantially all of the cations initially on the zeolite (initial cations) with sodium ions. This is accomplished by contacting the zeolite in particulate form with an aqueous solution of a water-soluble salt of the sodium or ammonium ions. Replacing the cations originally on the zeolite with sodium ions is preferred because of the greater thermal stability of sodium-exchanged zeolites. The most commonly used water soluble salts are those of the chlorides, nitrates and sulfates, although other salts can be used. The ion-exchange occurs readily when the zeolite is mixed with the aqueous solution. The mixture is usually gently agitated, and it may be warmed to speed up the ion-exchange. This step is desirable to facilitate recovery of excess lithium ion during the lithium ion-exchange described below. Accordingly, it can be performed at any convenient opportunity prior to the lithium ion-exchange step.

In any event, the zeolite, in its natural form, or in the sodium ion- or ammonium ion-exchanged form, is mixed with an aqueous solution of water-soluble salts of the desired trivalent ion or mixture of trivalent ions. This is preferably carried out by preparing an aqueous solution of the trivalent salt in a stirred vessel and adding the zeolite to the aqueous salt solution to form a dilute slurry. The anion of the salt is preferably chloride, nitrate or sulfate. The aqueous zeolite-trivalent salt slurry is gently stirred, with heating if desired, at a temperature generally in the range of about 20 to about 100° C., and preferably at a temperature in the range of about 20 to about 50° C. until the ion exchange is complete. The ion-exchange with the trivalent ion(s) goes rapidly to completion; accordingly the salt solution is generally prepared using the stoichiometric amount of trivalent ion that is desired in the zeolite product. Preparing the trivalent cation-exchanged zeolite by ion-exchanging the trivalent cation with zeolite powder ensures a uniform distribution of the trivalent cation throughout the zeolite, which is desirable to reduce the susceptibility of the zeolite to heat degradation. Thus, it is an important aspect of the invention to conduct the trivalent ion exchange of the zeolite prior to agglomerating the zeolite with the binder.

Upon completion of the trivalent ion exchange, the zeolite slurry is filtered by any suitable means, e.g. by means of a filter press, and, if desired, the filter cake is dried. The drying can be effected by any suitable means. The dried zeolite is next combined with the binder material and formed into small aggregates.

The binder used in the process of the invention can be any of the many binders that are available and that will not significantly interfere with the desired use of the zeolite as a gas adsorbent. Suitable binders include clays, silicas, aluminas, metal oxides and mixtures thereof; binary compositions, such as silica-alumina, silica-magnesia, silica-zirconia, silica-thoria, silica-beryllia, and silica-titania; and ternary compositions, such as silica-alumina-thoria, silica-alumina-zirconia. The particular binder used in the invention is not critical and any of the above or other binders can be used in the process of the invention. Clay is a preferred binder because of its low cost and ready availability.

The relative proportions of the zeolite and binder material may vary widely. In general, the aggregate generally comprises about 65 to about 99% zeolite and about 1 to about 35% binder, and preferably comprises about 80 to about 95% zeolite and about 5 to about 20% by weight binder (weight % on a dry basis).

The zeolite and binder are blended sufficiently to provide a uniform mixture, and the blended mixture is shaped into particles of the desired configuration and size, for example, cylindrical particles about 0.5 to about 5 mm in length and diameter. This can be accomplished by, for example extrusion and pelletizing or tabletting operations.

The shaped aggregates are next dried in preparation for the calcining step. Drying is generally carried out at a temperature in the range of about 25 to 250° C. under conditions that will not cause excessive attrition of the aggregates.

After being dried, the aggregate particles are calcined to set the binder and harden the particles so that they are more crush-resistant. This is accomplished by heating the shaped particles to a temperature in the range of about 400 to about 800° C., and preferably to a temperature in the range of about 500 to about 700° C.

Following the calcining step and prior to the lithium ion-exchange step, it is generally desirable to rehumidify the calcined agglomerated zeolite particles. Since rehydration is somewhat exothermic, it is preferable to gradually rehumidify the particles, as by lightly spraying them with water or by passing a humidified gas, such as air or nitrogen, through the particle mass. Also, if it has not been earlier done, the replacement of the initial cations with sodium or ammonium ions can be conveniently carried out at this point. This can be accomplished in the manner described above.

In accordance with the most preferred embodiment of the invention, the next step in the process is the lithium ion-exchange step. This can be accomplished agitating the agglomerated and calcined particles in a tank containing the aqueous lithium salt solution, but it is more efficient and convenient to load the agglomerated zeolite particles into a column and pass a stream of aqueous solution of the lithium salt either upwardly or downwardly through the column. The lithium salt can be any water-soluble salt, but it is preferable to use the chloride, nitrate or sulfate salt. The lithium ion-exchange is preferably carried out exhaustively, that is, until all of the residual original ions are replaced with lithium ions. The trivalent ions are bound more tightly to the zeolite than are lithium ions; hence these will not be replaced by the lithium ions. The lithium ion-exchange is more efficient when conducted at temperatures above about 70° C., and most efficient when conducted in the range of about 90 to about 100° C.

In a less preferred embodiment of the invention, the lithium ion-exchange step is carried out following the trivalent cation-exchange step, i.e. prior to the agglomeration of the zeolite with the binder. This embodiment is less advantageous because it is then necessary to calcine the agglomerated zeolite at temperatures below that at which thermal degradation of the zeolite occurs.

When the zeolite contains lithium ions, degradation occurs at a significantly lower temperature than when lithium ions are not present in the zeolite. As indicated above, it is preferred not to subject the lithium ion-exchanged zeolite to temperatures above about 700° C.

It is preferred that the ion-exchanged zeolite contain as its charge compensating ions about 50 to about 95% lithium ions, about 4 to about 50% trivalent cations and 0 to about 15% other cations, i.e. initial cations, and it is more preferred that the charge compensating ions comprise about 70 to about 95% lithium ions, about 5 to about 30% trivalent cations and 0 to about 10% other cations. It is most preferred that the amount of initial ions remaining on the ion-exchanged product be below about 5%.

Following the lithium ion exchange of the agglomerated zeolite particles, the particles are dried and activated. Activation can be accomplished by heating the particulate zeolite material sufficiently to drive off the water but not at a temperature high enough to cause degradation of the zeolite. In general, activation of the agglomerated trivalent cation- and lithium ion-exchanged zeolite is conducted at a temperature in the range of about 200 to about 700° C., and preferably at a temperature in the range of about 400 to about 600° C.

The invention is further illustrated by the following examples.

EXAMPLE 1

In this example extruded and calcined pellets containing 80% zeolite type X having a composition of 0.77 $Na_2O$: 0.23$K_2O$: 2$SiO_2$: 1$Al_2O_3$, and 20% clay binder were used. The pellets were placed in an aqueous solution of a mixture of rare earth ions (having a liquid-to-solid ratio of about 8 and a pH of about 3.5) at a temperature of about 75° C. Although the total amount of rare earth ions in the solution was sufficient to exchange about 13 equivalent percent of the original ions on the zeolite, only about 70% of the rare earth ions were consumed in the ion-exchange. The rare earth ion-exchanged zeolite was then contacted with an aqueous solution of lithium ions and then dried and activated. Analysis showed that the product of this example contained 9.2 equivalent % rare earth cations, 88.5 equivalent % lithium ions and 2.3 equivalent % other alkali metal ions.

X-ray photoelectron spectroscopy (XPS) analysis of a particle of the rare earth ion-and lithium ion-exchanged zeolite showed that the surface of the particle contained 2.24 atom % of lanthanum ions but no lanthanum cations were detected in the interior of the particle.

EXAMPLE 2

An aqueous rare earth chloride solution was prepared by dissolving 824 g of a commercial rare earth mixture (sold by Molycorp under the trade designation lanthanum-Ln Chloride Solution 5240) in 68 liters of water at room temperature. To this solution was added 6.6 Kg of zeolite X having the composition 1 $Na_2O$: $2SiO_2$: $1Al_2O_3$ and the mixture was stirred overnight. The slurry was filtered and the filtered solids were added to an aqueous solution of lithium chloride containing 10 Kg of LiCl dissolved in about 68 liters of water. The lithium ion-exchange was repeated twice. The slurry was filtered and dried to a moisture content of about 20%.

Adsorbent pellets were prepared by blending 3,850 g of the lithium ion- and rare earth cation-exchanged type X zeolite with 1,003 g of attapulgite clay and extruding and pelletizing the blend through a 1/16" die. The pellets were then dried and calcined at 580° C. Analysis showed that the product of this example contained 11.5 equivalent % rare earth cations, 87.1 equivalent % lithium ions and 1.4 equivalent % other alkali metal ions.

XPS analysis showed that the surface area and interior area contained 0.16 and 0.18 atom %, respectively of lanthanum.

Although the sample in this example was prepared in accordance to a less preferred embodiment (in that the lithium ion-exchange step took place before agglomeration and calcination of the zeolite-binder blend and thus had to be calcined at a lower temperature to avoid degradation of the product), it is useful to show that the rare earth ions were distributed substantially equally between the surface and interior areas of the examined particle.

EXAMPLE 3

An aqueous rare earth chloride solution was prepared by dissolving 760 g of rare earth mixture (lanthanum-Ln Chloride Solution 5240) in about 68 liters of water at room temperature. To this solution was added 6.25 Kg of zeolite X having the composition 0.77 $Na_2O$: 0.23 $K_2O$: $2SiO_2$: $1Al_2O_3$ and a moisture content of about 20%, and the mixture was stirred overnight. The slurry was filtered, washed and dried at 100° C.

Adsorbent pellets were prepared by blending 4,659 g of the rare earth cation-exchanged type X zeolite with 1,194 g of attapulgite clay and extruding and pelletizing the blend through a 1/16" die. The pellets were then dried and calcined at 580° C. The dried pellets were then placed in a glass column and rehydrated by passing humidified nitrogen through the column. A solution of sodium chloride, comprised of 5 Kg NaCl and about 68 liters of water was circulated through the zeolite bed at 85° C. The sodium chloride exchange step was repeated. A solution of lithium chloride comprised of 6 Kg of LiCl dissolved in about 80 liters water at 85°/C., was recirculated through the zeolite bed and the bed was drained. The lithium chloride exchange step was repeated twice. Analysis showed that the product of this example contained 9.4 equivalent % rare earth cations, 86.4 equivalent % lithium ions and 4.2 equivalent % other alkali metal ions.

An XPS analysis was not conducted on particles of the zeolite prepared in this example, however it is expected that such analysis will show that the rare earth ions are distributed uniformly throughout the particles.

Although the invention has been described with particular reference to specific experiments, these features are merely exemplary of the invention and variations are contemplated. For example, trivalent cations other than rare earth ions can be used in cation-exchanging the zeolite and other zeolites can be cation-exchanged. The scope of the invention is limited only by the breadth of the appended claims.

What is claimed is:

1. A method of preparing ion-exchanged zeolites in particulate form comprising partially ion-exchanging the zeolite in powdered form with one or more trivalent ions, agglomerating and calcining the partially trivalent cation-exchanged zeolite, hydrating the calcined agglomerate, thereafter ion-exchanging the hydrated calcined agglomerate with lithium ions, and activating the trivalent cation- and lithium ion-exchanged zeolite.

2. A method of preparing zeolite adsorbents comprising:
   (a) contacting a zeolite in powdered form and having as initial exchangeable cations one or more ions selected from sodium, potassium, ammonium, hydronium, calcium, strontium, magnesium, barium, zinc and copper (II) ions with an aqueous solution of one or more trivalent cations selected from aluminum, scandium, gallium, iron (III), chromium (III), indium, yttrium, single lanthanides, mixtures of two or more lanthanides and mixtures of these, thereby substituting some of said initial exchangeable cations on said zeolite with trivalent cations;
   (b) separating the trivalent cation-exchanged zeolite from said aqueous solution;
   (c) blending said partially trivalent cation-exchanged zeolite with a binder, and shaping the blended trivalent-exchanged zeolite-binder mixture into aggregate particles;
   (e) calcining said aggregate particles at a temperature of about 400 to about 800° C.;
   (f) hydrating the calcined aggregate particles,
   (g) thereafter contacting the hydrated calcined aggregate particles with an aqueous solution of lithium ions, thereby substituting at least some of the remaining initial exchangeable cations with lithium ions and producing zeolitic particles whose exchangeable cations comprise, on an equivalents basis, about 50 to about 95% lithium ions, about 4 to about 50% trivalent cations and 0 to about 15% of said initial exchangeable cations; and
   (h) activating the trivalent cation-exchanged and lithium ion-exchanged aggregate particles by heating them to a temperature of about 200 to about 700° C.

3. The process of claim 1 or claim 2, wherein the lithium- and trivalent-exchanged zeolite contains, on an equivalents basis, about 5 to about 30% trivalent cations, about 70 to about 95% lithium ions and 0 to about 10% initial exchangeable cations.

4. The process of claim 2, wherein step (e) is carried out at a temperature of about 500 to about 700° C.

5. The process of claim 1 or claim 2, wherein said zeolite is zeolite type X.

6. The process of claim 5, wherein said trivalent cations are selected from aluminum, cerium, lanthanum, mixtures of two or more lanthanides in which the total lanthanum, cerium, praseodymium, and neodymium ions present in the mixtures comprises at least 50% of the total lanthanide ions, and mixtures of these.

7. The process of claim 5, wherein the atomic ratio of silicon-to-aluminum in the zeolite lattice is between 0.9 and 1.10.

8. The process of claim 2, further comprising, prior to step (g), replacing at least some of said initial exchangeable cations on said zeolite with sodium ions or ammonium ions by contacting said zeolite with an aqueous solution of a sodium salt.

9. The process of claim 8, wherein the initial cations are replaced with sodium ions prior to step (a) or between steps (f) and (g).

10. The process of claim 2, wherein step (a) is carried out at a temperature in the range of about 20 to about 50° C.

11. The process of claim 2, wherein step (a) comprises forming an aqueous solution of one or more salts of said one or more trivalent cations, and mixing said zeolite with said aqueous solution.

12. The process of claim 11, wherein the anions of said one or more salts are selected from chloride ions, nitrate ions, sulfate ions and mixtures of these.

13. The process of claim 2, wherein step (g) is carried out by contacting the calcined aggregate particles with a stream of an aqueous solution of lithium salt.

14. The process of claim 13, wherein step (g) is carried out at a temperature above about 70° C.

15. The process of claim 13, wherein said lithium salt is lithium chloride, lithium nitrate, lithium sulfate or a mixture of two or all of these.

16. The process of claim 15, wherein step (g) is carried out at a temperature in the range of about 90 to about 100° C.

* * * * *